Dec. 24, 1940.  H. W. ALEXANDER  2,226,300
REMOVABLE OPTICAL SYSTEM FOR LUMINAIRES
Filed Sept. 26, 1938  3 Sheets-Sheet 1
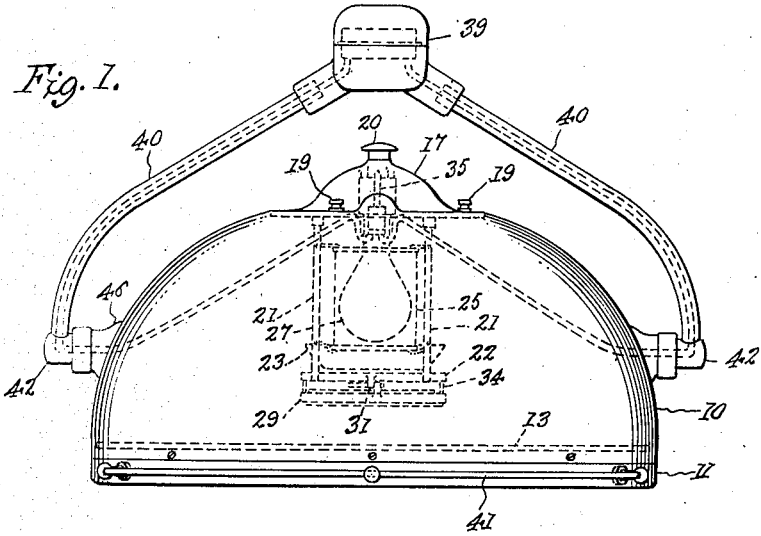
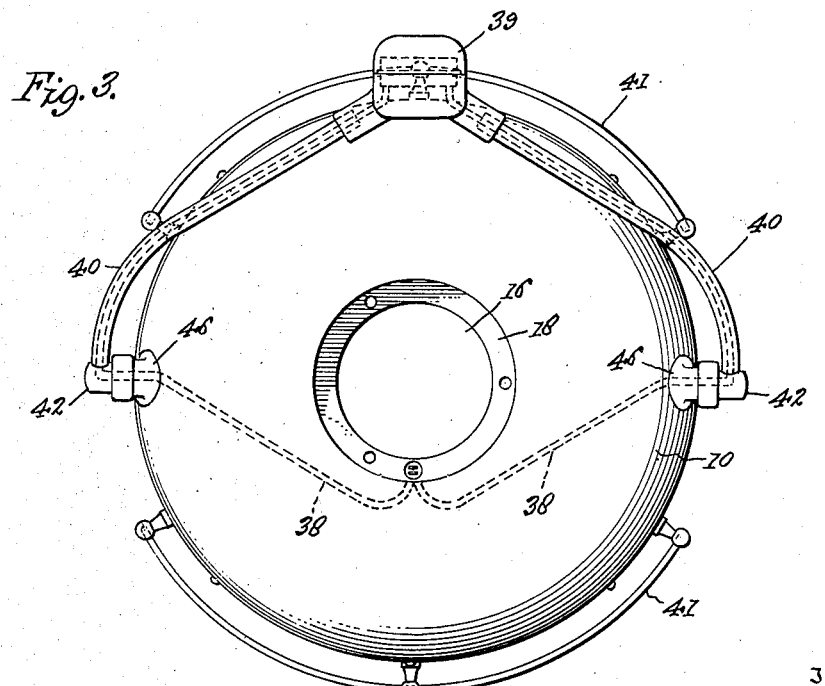
Inventor
Horace W. Alexander
By Mawhinney & Mawhinney
Attorneys.

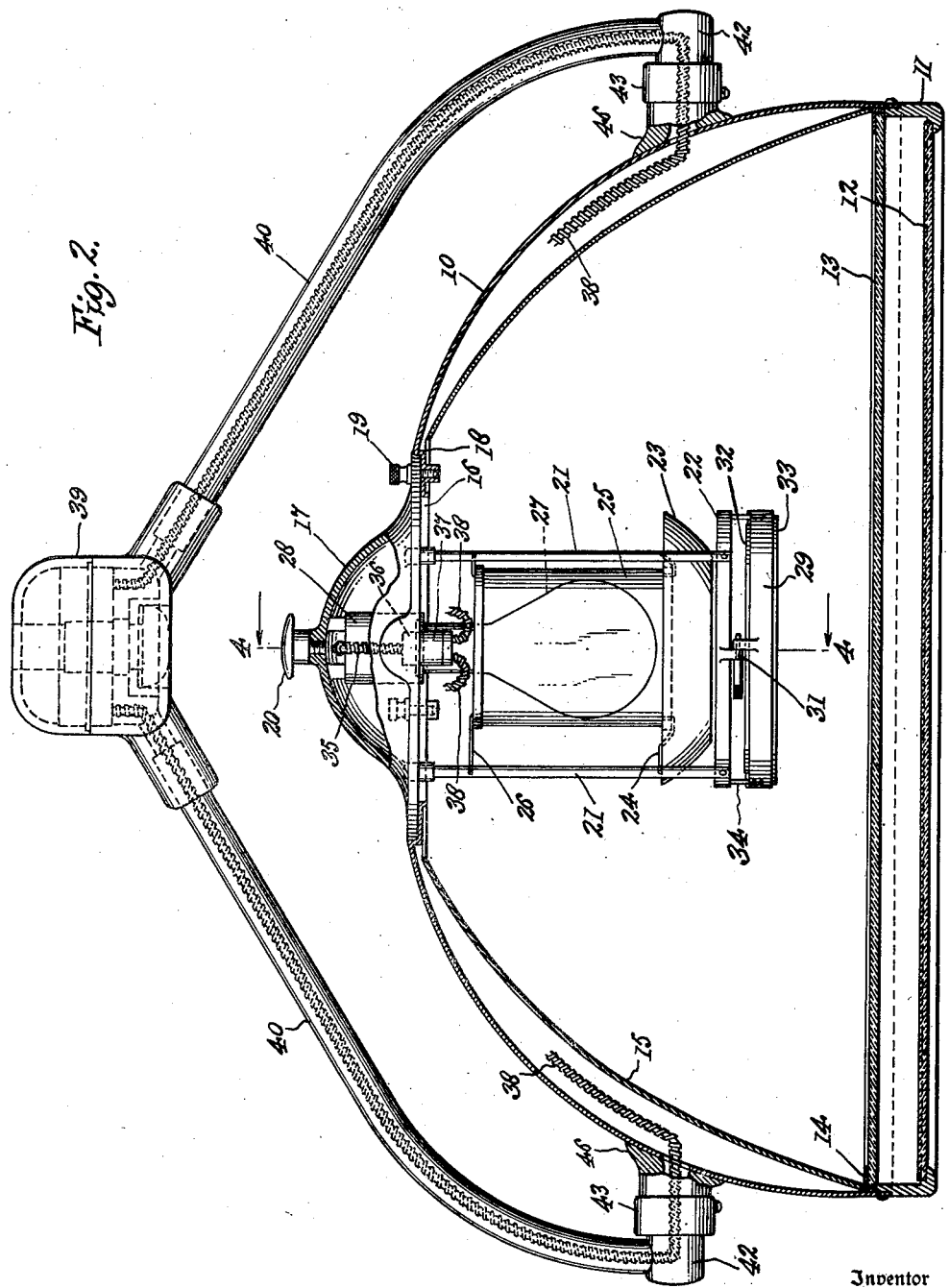

Dec. 24, 1940. H. W. ALEXANDER 2,226,300
REMOVABLE OPTICAL SYSTEM FOR LUMINAIRES
Filed Sept. 26, 1938 3 Sheets-Sheet 3
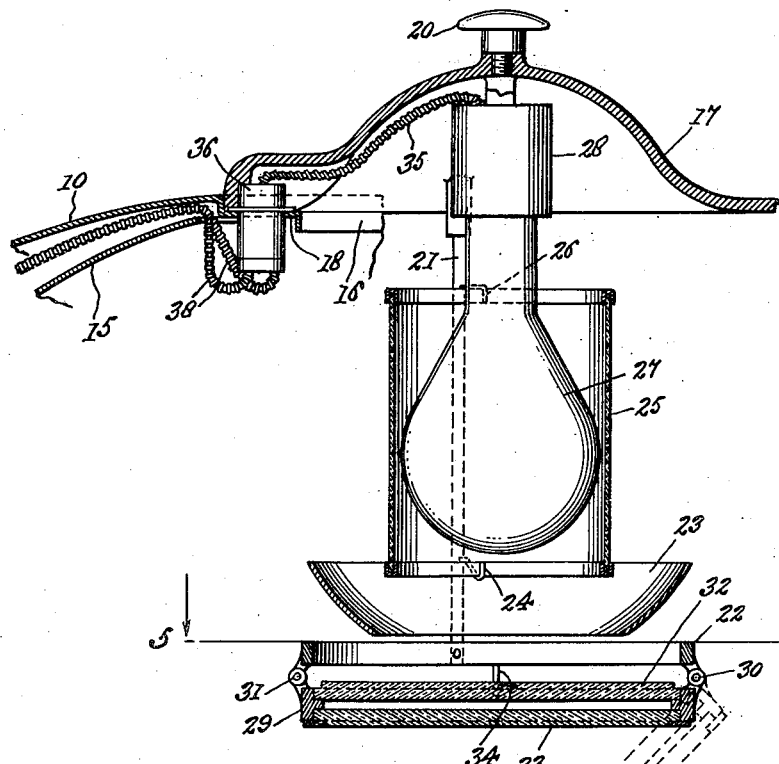
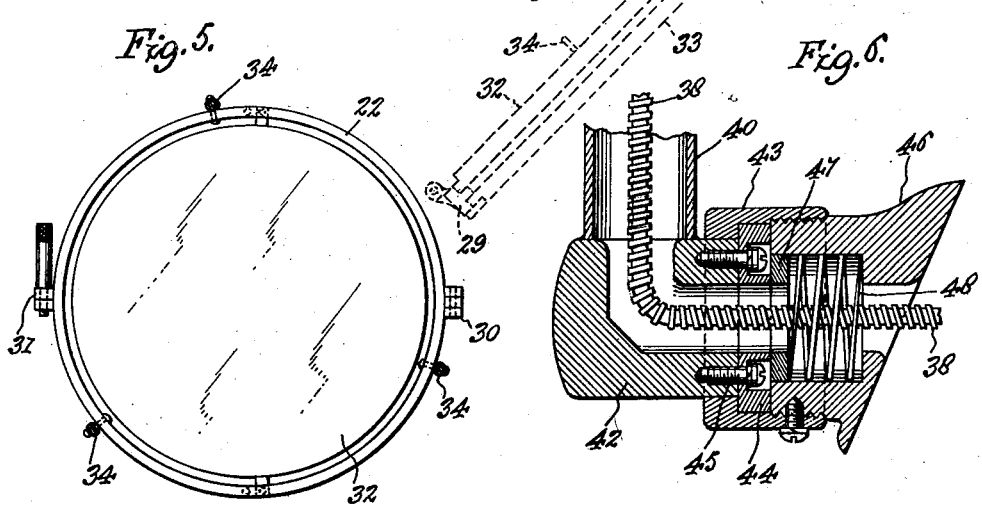
Inventor
Horace W. Alexander
By Mawhinney & Mawhinney
Attorneys.

Patented Dec. 24, 1940

2,226,300

UNITED STATES PATENT OFFICE 2,226,300

REMOVABLE OPTICAL SYSTEM FOR LUMINAIRES

Horace W. Alexander, Erie, Pa., assignor to American Sterilizer Company, Erie, Pa., a corporation of Pennsylvania Application September 26, 1938, Serial No. 231,822

9 Claims. (Cl. 240—1.4)

The present invention relates to luminaries, adaptable particularly to surgical work for illuminating operating tables and the like.

An object of the invention is to provide a luminaire with an optical system which may be easily and quickly removed and to which access may be readily gained for cleansing and the like without dismantling the entire luminaire.

Another object of the invention is to provide the luminaire with a removable cap on which is mounted or suspended the optical system of the luminaire, and which cooperates with the casing or body to complete the lighting circuit for the lamp, or source of illumination, when the cap is in place and which disconnects the lamp from the source of electrical energy merely by removing the cap in the act of withdrawing the optical system from the casing.

A further object is to provide a suspended and pivoted casing with a trunnion structure through which the lead-in wires may be carried and with a suitable separable contact device for cooperation with the cap so that the cap and the optical system carried thereby may be removed from the casing and the optical system and its cap be entirely freed from all wiring and other parts of the casing.

Another object of the invention is to provide an optical system mounted on a removable cap and provided with a hinged door carrying the optical lens admitting quick and easy access to the lamp and other interior parts of the optical system.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a side elevation of a surgical luminaire embodying the removable optical system carrying cap of this invention.

Figure 2 is an enlarged vertical section taken substantially centrally through the luminaire, showing the cap in place supporting the optical system at the focal center of the reflector.

Figure 3 is a top plan view of the luminaire with the cap and its optical system removed.

Figure 4 is an enlarged detail fragmentary sectional view on the line 4—4 of Figure 2 through the cap and the optical system, parts of the casing and reflector being shown, and the dotted lines showing the optical lens carrying door in partly open position, Figure 5 is a detail sectional view of the lens carrying door taken substantially on the line 5—5 of Figure 4, and Figure 6 is a detail enlarged sectional view through one of the trunnions of the casing, showing a lead-in wire threaded therethrough.

Referring now to the drawings, the body portion of the luminaire comprises a housing or casing 10 which may be of any suitable configuration, such as of hemispherical shape, as shown.

The large end of the housing 10 is open and fitted with a ring frame 11 in the lower portion of which is mounted the primary lens 12. The ring frame 11 also carries a second lens 13 provided with a marginal ring 14 which is seated within the housing 10 upon the upper edge of the ring frame 11. A reflector 15, of parabolic or other suitable form, is disposed in the housing 10 and is seated at its free outer edge upon the ring 14 of the second lens 13, and is thus supported by the ring frame 11.

The upper smaller end of the housing 10 has a small opening 16 therethrough, and this opening extends through the inner end of the reflector 15. The housing 10 has a removable cap 17, of dome or other desired configuration, which is seated at its lower edge portion in a depressed seat 18 to center the cap. The cap 17 is detachably held in place by a desired number of thumb screws 19, or their equivalent. A knob or handle 20 is carried by the cap 17 to facilitate removal and handling of the cap when released by the thumb screws.

The optical system of the luminaire is wholly carried by and removable with the cap 17, and the opening 16 through the housing 10 and reflector 15 is of sufficient size to receive therethrough the optical system when the cap 17 is removed from and replaced on the housing 10.

The optical system may of course vary in detail construction. The present illustrated form of the optical system comprises rods 21 which are threaded at their upper ends into the underside of the cap 17 and which are secured at their lower ends to a ring 22. A frusto-conical or the like secondary reflector 23 is secured to and fitted between the lower end portions of the rods 21 a short distance above the ring 22, and the said lower end portions of the rods 21 also carry hook brackets or arms 24 which extend radially inward from the rods 21 at the top of the secondary reflector 23, and which are offset downwardly into the reflector 23 to support thereon the lower edge of a filter glass cylinder 25 which rises centrally from the reflector between the rods 21. Upper brackets or arms 26 extend inwardly from the rods 21 and engage the upper portion of the filter glass cylinder 25 to hold it in position. The brackets or arms 24 and 26 may be spring arms admitting the quick and easy removal of the cylinder 25 from the rods and other parts of the frame of the optical system.

Suspended from the inner central portion of the dome cap 17 is a source of illumination 27 embodied in an electric lamp detachably engaged in a lamp socket 28 secured in the cap 17 and from which the lamp 27 hangs. The neck of the lamp 27 and the connection of the socket 28 are proportioned to dispose the lamp filament at the desired point of radiation in the cylinder 25, or at the center of the optical system.

The ring 22 carries a circular door 29 connected at one side by a hinge 30 to the ring 22 and releasably connected at its opposite side to the ring 22 by a door lock 31; shown in the form of apertured and threaded lugs and a threaded knurled pin. The door 29 carries an optical lens 32 adapted to register beneath the secondary reflector 23, and a lower heat controlling lens 33. By releasing the lock 31 the door 29 may be swung down, as shown in dotted lines in Figure 4, and free access may be had to the lamp 27 and the other parts of the optical system. Spacers 34 may be carried by the door 29 between the hinge 30 and the lock 31 to engage the ring 22 when the door is closed to hold the door with its lenses 32 and 33 at right angles to the longitudinal axis of the optical system.

The electric wires from the lamp socket 28 may be led in the form of a cable 35 from the socket 28 along one side of the cap 17 to a contact plug 36 which is secured in the cap and carried thereby when the cap is removed from the housing. A contact receptacle 37 is secured to the housing 10 at one side through the seat 18. The receptacle 37 registers with the contact plug 36 when the latter is in proper position as determined by the thumb screws 19, or in any other suitable manner, so that by the final seating of the cap 17 on the housing the contacts of the plug 36 engage in the receptacle 37 and complete that portion of the circuit through the lamp 27.

The receptacle 37 is fixed in the housing 10, and the circuit wires 38 leading from the receptacle may be carried in opposite directions through the space in the luminaire body between the housing 10 and the reflector 15.

The luminaire body is suspended in a yoke having a swivel head 39 for attachment to the ceiling, or the like, and having a pair of diverging arms 40 of light steel tubing. The lower ends of the arms 40 are pivotally secured to the opposite sides of the housing 10 on a transverse axis intermediate the top and bottom of the housing, and the lower end of the housing may have a hand rail 41 to facilitate the manual tilting of the housing in the yoke and the turning of the yoke with the housing on the vertical axis of the swivel head 39.

The pivoted mounting of the housing 10 in the yoke may be effected in any suitable manner and, as shown, the yoke arms 40 have each an elbow 42 the angular portion of which is directed inwardly toward the housing and provided with a cylindrical outer surface receiving a flanged nut 43 thereover. A bearing flange 44 is secured by bolts 45 or the like against the end of the elbow 42 and has bearing in the nut 43 between the flange thereof and a hollow trunnion 46 projecting from the side of the housing 10. As shown in Figure 6, this trunnion structure is hollow and one of the electric wires 38 from the receptacle 37 is threaded outwardly through the trunnion 46, elbow 42 and through the adjacent yoke arm 40 to the swivel head 39. In like manner the opposite wire 38 is carried out through the opposite trunnion structure and through its yoke arm 40 to the swivel head 39 to complete the electric circuit to the lamp 27. A friction washer 47 bears against the elbow flange 44 and is pressed thereagainst by a helical spring 48 seated in the trunnion 46. The washer 47 frictionally holds the housing 10 in desired angularly tilted position in the yoke.

The above described type of luminaire is set forth more in detail in my Patent No. 2,173,325.

When access is desired to the optical system of the luminaire it is only necessary to release the thumb screws 19 and lift the cap 17 from the housing 10. As the entire optical system is carried solely by the cap 17 the optical system is raised out of the luminaire body through the opening 16 when the cap is raised. This may be accomplished by grasping the knob or handle 20. As shown in Figure 4, the door 29 may be released by withdrawing the pin of the lock 31 and swung down to permit access to the enclosed parts of the optical system. By the one operation of lifting the cap 17 from the housing 10 the electric circuit is broken and the contact plug 36 is lifted from the receptacle 37 so that no trailing wires or cords have to be handled, and the cap 17 and the optical system are entirely separate and disconnected from the luminaire body. The act of replacing the cap 17 on the housing 10 again closes the circuit through the plug 36 and the receptacle 37 and no further wiring connections have to be made.

What is claimed is:

1. In a surgical luminaire, a housing having a reflector therein and bottom lenses, a cap removably mounted on the upper end of the housing, an optical system connected by the cap suspended therefrom in the housing, said optical system having an electric lamp, a contact plug carried by the cap with the contacts carried to said lamp, a plug receptacle carried by the housing for receiving the contacts of said plug and having electric wires leading therefrom between the housing and the reflector, a yoke pivotally connected to the housing for supporting the same and having openings therethrough for the reception of said wires to include said lamp in an electric circuit, said cap adapted to be removed from the casing for withdrawing the optical system and withdrawing said contact plug from the receptacle.

2. In a luminaire, a body housing having a reflector therein, a cap removably mounted on the upper end of the housing, an optical system carried by the cap and including supporting rods with a hinged lens door at their lower ends and a secondary reflector carried by the rods above the door, said optical system also having a filter glass cylinder supported between the rods above the secondary reflector and provided with an electric lamp suspended from the cap within the cylinder, a two-part separable contact device disposed between the cap and the housing with the cap part connected to the lamp and the housing part having wires extending between the reflector and the housing and passing outwardly through the yoke, said cap adapted to be removed for separating the contact connector and for removing the optical system as a unit from the housing, said lens door of the optical system adapted to be swung into open position to permit free access to the cylinder and lamp.

3. In a luminaire, a body housing having a reflector therein and provided with an opening through the upper end of the housing and reflector, said housing having marginal seat about said opening, a cap removably secured on said seat, a plurality of rods secured to the underside of the cap and projecting downwardly in the housing, a ring connecting the lower ends of the rods, a lens door hinged to said ring adapted to be swung into open position to admit access to the opposite sides of the door and to the space within said ring, a secondary reflector connected by the rods above said ring, bracket arms extending inwardly from the rods above said reflector, a filter glass cylinder mounted on said arms, a source of illumination suspended from the cap in said cylinder and having a connector part mounted in the cap, a second connector part mounted in the housing and having wires leading therefrom for including the source of illumination in an electric circuit, and a hollow yoke pivotally connected to the housing and receiving said wires therethrough for adjustably supporting the housing in the yoke.

4. In a luminaire, a housing having a reflector therein, a cap removably mounted on the upper end of the housing, an optical system suspended from the cap in the housing and adapted to be removed therefrom by the removal of the cap, said optical system having an electric lamp surrounded by a cylindrical glass filter and a secondary reflector disposed directly below said lamp, a circuit connector having interfitting parts respectively on the cap and housing and provided with wires leading through the cap to the source of illumination of the optical system and having wires leading through the housing to opposite sides thereof, hollow trunnions extending from the opposite sides of the housing, a yoke having hollow arms with elbow bearings on its lower end connected to said trunnions, said wires being threaded through the hollow trunnion elbows and arms of the yoke to establish a circuit connection with the source of illumination and friction means between the yoke arms and said housing for maintaining the latter in adjusted tilting position in the yoke.

5. In a luminaire adapted for use in operating rooms, a housing having a reflector and bottom lenses mounted therein, said housing being provided with an opening, a removable cap mounted over said opening and having a raised portion thereover, an optical system suspended from the raised portion of said cap including an electric lamp and a glass filter surrounding said lamp, a socket for the lamp within the raised portion of the cap, a separable circuit contact means having a plug mounted within said raised portion and connected by a wire to said socket and a plug receptacle mounted in the housing for connection to the source of current, said cap adapted to be lifted from the housing thereby separating the circuit contact means and withdrawing the optical system.

6. In a surgical luminaire, a housing having a reflector and bottom lenses therein, a cap detachably mounted upon the upper end of the housing, said cap having a raised inner portion, an optical system including an electric lamp connected to the raised inner portion of said cap and suspended therefrom within the housing, a contact plug carried within the raised portion of the cap and connected to said lamp, a contact receptacle mounted within the housing to receive the plug and provided with circuit wires leading therefrom between the housing and reflector, a yoke having hollow arms mounted on said housing and receiving the said wires therethrough for connecting the lamp in an electric circuit, and friction means between the yoke arms and the housing for maintaining the latter in desired tilted position in the yoke.

7. In a luminaire for use in operating rooms comprising, a housing having a reflector and two spaced apart bottom lenses mounted therein, said housing being provided with an opening at the upper end thereof, a removable cap mounted over said opening, an optical system including an electric lamp suspended from said cap, a separable connector having a plug on the cap and a plug receptacle on the housing for interfitting engagement when the cap is in place to connect the lamp in circuit, and supporting means including two spaced apart arms pivotally connected each to oppositely disposed sides at said housing.

8. A luminaire for use in operating rooms comprising, a housing having a reflector and at least two spaced apart bottom lenses mounted therein, said housing being provided with an opening at the upper end thereof, a removable cap mounted over said opening, an optical system including an electric lamp suspended from said cap, and a separable connector having a plug on the cap and a plug receptacle on the housing for interfitting engagement when the cap is in place to connect the lamp in circuit.

9. A surgical luminaire comprising, a housing having a reflector and at least two spaced apart bottom lenses therein, a cap detachably mounted upon the upper end of the housing, an optical system suspended from the cap into said housing and into the optical center of the reflector, and a plug and receptacle connection carried by the cap and the housing for connecting the source of illumination of the optical system in circuit when the cap is in place.

HORACE W. ALEXANDER.